UNITED STATES PATENT OFFICE.

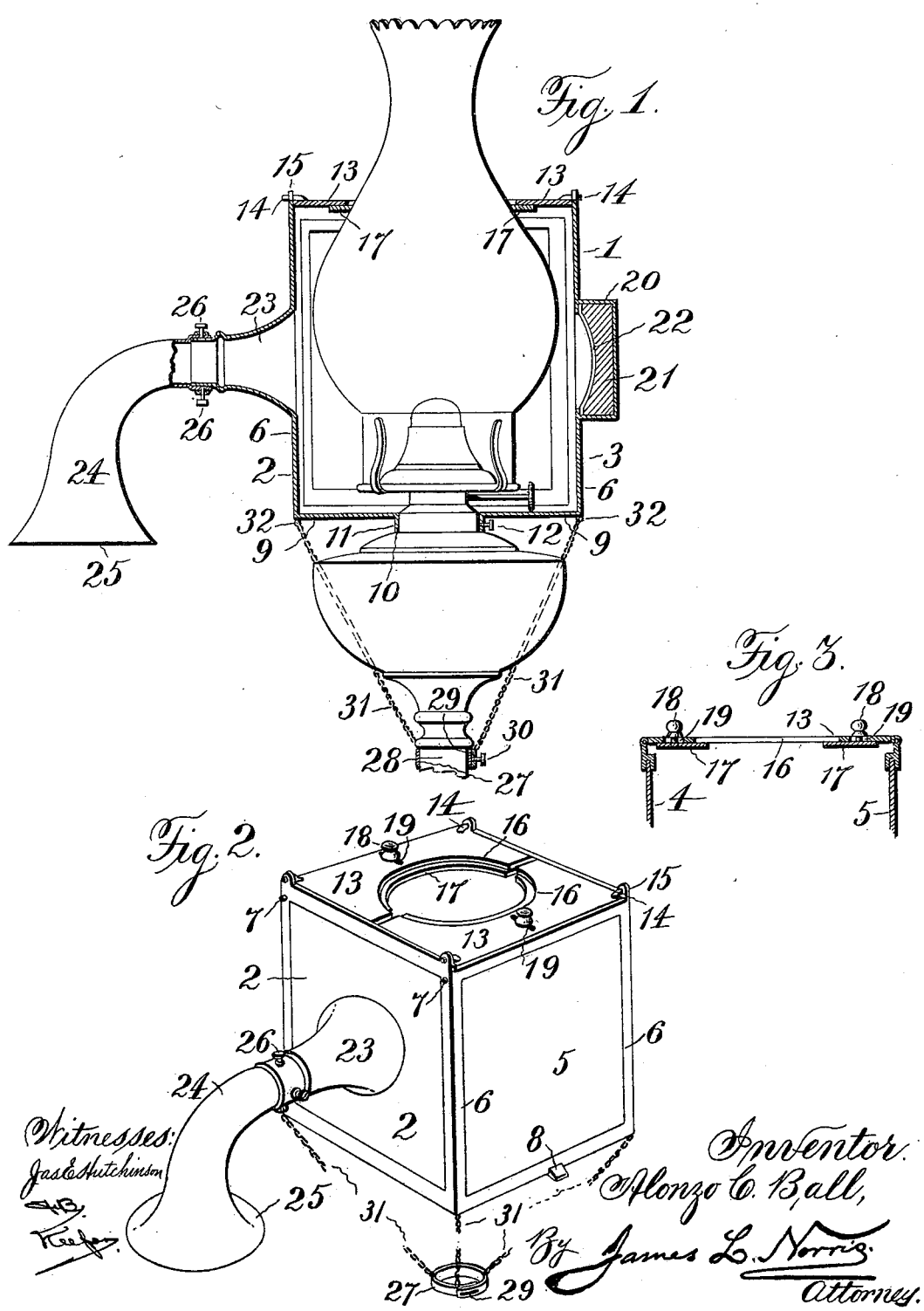

ALONZO C. BALL, OF WINONA, MISSISSIPPI.

REFLECTING ATTACHMENT FOR LAMPS.

SPECIFICATION forming part of Letters Patent No. 636,615, dated November 7, 1899.

Application filed July 15, 1899. Serial No. 723,943. (No model.)

*To all whom it may concern:*

Be it known that I, ALONZO C. BALL, a citizen of the United States, residing at Winona, in the county of Montgomery and State of Mississippi, have invented new and useful Improvements in Reflecting Attachments for Lamps, of which the following is a specification.

This invention relates to reflecting attachments for lamps, and has for its object to provide a device of this character which can be readily and quickly applied to and removed from lamps of ordinary construction and when so applied will act to concentrate the light-rays and throw them in any direction desired.

It is the prime object of the invention to provide a reflecting attachment for lamps that will be simple in construction, cheap to manufacture, and one especially adapted for pulpit use or for general reading and working purposes, the construction being such that the tube through which the light-rays pass may be adjusted to throw the said rays in different directions to suit the peculiar exigencies of the case.

The invention further comprises the features of construction and arrangement of parts hereinafter described and then more definitely pointed out in the claims which conclude this specification.

In order to enable others skilled in the art to which the invention pertains to make and use the same, I will proceed to describe the attachment in detail, reference being had for this purpose to the accompanying drawings, wherein—

Figure 1 is a sectional side elevation of my reflecting attachment applied to a lamp. Fig. 2 is a perspective view of the attachment shown removed from the lamp. Fig. 3 is a transverse sectional view through the top portion of the casing.

Referring now to the drawings, the reference-numeral 1 designates a frame which in the present instance is shown as being rectangular in form, although I do not wish to be understood as limiting myself to this shape. This frame is preferably made of metal and has its front 2 and back 3 made of some opaque material, while the sides 4 and 5 are composed of translucent material, preferably stained glass. One or both of the sides 4 5, as may be desired, are composed of skeleton metal frames 6, into which the translucent panes fit, and having pintles 7 at their upper ends, by which they are hinged to the top of the frame 1, as clearly shown in the drawings, the lower ends of the said skeleton frame being held in a closed position by means of suitable clasps or spring-latches, such as 8. The bottom 9 of the frame 1 is provided with an enlarged opening 10 to fit over the lamp-burner, and depending from said bottom, around the opening, is an annular flange 11, provided with thumb-screws 12, by which the frame may be securely held to the lamp. The top of the frame is composed of two leaves or flaps 13, provided with pintles 14 at their outer opposite corners, which enter perforated ears 15 on the top of the frame 1, whereby said leaves or flaps may be swung back or open to admit of the removal of the lamp-chimney when desired. The said leaves or flaps 13 are further provided with cut-out portions 16 at the center, which when the leaves are closed form a central opening in the top for the top of the lamp-chimney to project through, and upon the under side of each leaf or flap is a slide 17, working in suitable guides and each having a finger-piece 18 projecting through a slot 19 in the leaves or flaps, whereby the said slides may be moved toward and from each other to contract or diminish the size of the lamp-chimney opening, whereby said opening may be suited to chimneys of different sizes. The front edges of the slides are curved or rounded in order to fit the contour of the chimney.

The rear side or back 3 of the frame 1 is formed with a centrally-disposed opening, and projecting outward from said opening is an annular flange or collar 20, containing a weight 21 for a purpose presently to appear, and in front of said weight is a fixed concaved reflector 22, which is disposed directly behind the flame or burner of the lamp.

The front wall 2 of the frame 1 is provided with a central opening, which is disposed directly opposite the reflector 22, and projecting outward from the face of the said wall 2 around said opening is a tapering light-conducting tube 23, and swiveled upon the end of said tube, so as to rotate thereon, is a light-projecting tube 24 of elbow form, said tube 24 being provided with a flaring mouth 25, as will be seen from the drawings. The said tubes 23 and 24 are highly polished on their interior surfaces, so as to act as reflectors, and owing to the swivel connection between them the elbow-shaped tube 24 may be adjusted to various positions, so as to direct the light-rays in the direction desired. The tubes are retained in operative connection and rigidly held in such adjusted positions through the medium of a locking device composed, as here shown, of a set screw or screws 26, arranged at the point of connection between the two tubes.

The weight 21, it will be seen, is located directly opposite the light-projecting tubes and is employed as a counterbalance for them, so that the reflecting attachment will remain practically level upon the lamp under all ordinary conditions.

The top and bottom of the reflecting attachment, as well as the front and back, and also the light-conducting tubes, are each composed of some opaque material, while the sides 4 and 5 are composed of stained glass or other translucent substance or material. Owing to the fact that the sides 4 and 5, one or both, are hinged to the frame 1, access to the interior thereof may be readily had for the purpose of lighting and extinguishing the lamp, while the hinged leaves at the top permit of easy application of the attachment to a lamp and render the removal of the lamp-chimney possible when desired for the purpose of cleaning or for other purposes.

The operation of the attachment will be readily understood from the foregoing description and following brief statement: The frame is placed over the lamp and fixed thereto by the thumb-screws 12, so that the flame issuing from the lamp-burner will be directly opposite the reflector 22, whereupon the light-rays will be reflected through the light-tubes 23 and 24 and finally discharged through the flaring mouth 25 in concentrated form in a direction according to the adjusted position of said elbow-tube 24.

From the foregoing it will be seen that I have provided a simple reflecting attachment that can be easily and quickly adjusted to lamps of ordinary construction and of different sizes and wherein the light-rays may be directed in a strongly-concentrated form to any position or upon any object desired.

In order to more securely hold the attachment upon the lamp, I prefer to employ a split band or collar 27, of flexible material, adapted to encircle or pass around the lamp-standard 28, or it may be fitted around the oil-compartment, as desired, said band or collar being provided with a slot 29 and thumb-screw 30 to secure the ring or collar in place when so adjusted. From this band or collar I lead four cords or chains 31, which are secured at their upper ends 32 to the bottom of the attachment or frame 1 at the four corners thereof, as clearly shown in Fig. 1 of the drawings. The flexible band or collar 27 being split and having overlapping ends, it will be seen that the same can be fitted to lamps of different sizes and quickly adjusted to position, so as to securely hold the reflecting attachment in place.

What I claim, and desire to secure by Letters Patent, is—

1. A reflecting attachment for lamps comprising a rectangular frame adapted to be removably supported upon a lamp, said frame having translucent sides and opaque front and rear walls and two hinged leaves or flaps at the top having cut-out portions to provide a central chimney-opening, a reflector located within the frame, a light-conducting tube extending outward from the front wall of the frame opposite the reflector, and a light-projecting tube of elbow form adjustably mounted upon the end of said conducting-tube, substantially as described.

2. A reflecting attachment for lamps comprising a rectangular frame adapted to be removably supported upon a lamp, said frame having translucent sides hinged at their upper ends to the frame, and opaque front and rear walls, and two hinged leaves or flaps at the top having curved cut-out portions to provide a central chimney-opening, a reflector located within the frame, an open light-conducting tube extending outward from the front wall of the frame opposite the reflector, and a light-projecting tube of elbow form adjustably mounted upon the end of said conducting-tube, substantially as described.

3. A reflecting attachment for lamps comprising a rectangular frame or casing adapted to be removably supported upon a lamp, said frame or casing having translucent sides hinged at their upper ends to the frame and opaque front and rear walls, and two hinged leaves or flaps at the top having curved cut-out portions to provide a central chimney-opening, a slide carried by each leaf or flap arranged to move to and from each other and over the chimney-opening, a reflector located within the frame or casing, an open light-conducting tube extending outward from the front wall of the frame or casing, and a light-projecting tube of elbow form adjustably mounted upon the end of said conducting-tube, substantially as described.

4. A reflecting attachment for lamps comprising a suitable casing having closed sides and a reflector upon the interior of said casing, an open light-conducting tube extending outward from the front wall of the casing, a light-projecting tube of elbow form adjustably mounted upon the end of said conducting-tube, and a counterbalancing-weight mounted in the side of the casing opposite the side carrying the said light-tubes, substantially as described.

5. A reflecting attachment for lamps comprising a suitable frame or casing adapted to be removably supported upon a lamp, said frame or casing having translucent sides hinged thereto and opaque front and rear walls, leaves or flaps hinged at their outer opposite corners to the top of the frame or casing and each provided with a cut-out portion to form a central chimney-opening, a reflector located within the frame or casing, an open and tapering light-conducting tube extending outward from the front wall of the casing, a light-projecting tube of elbow form adjustably mounted upon the end of said conducting-tube, and a counterbalancing-weight fixed to that side of the frame or casing opposite to the said light-tubes, substantially as described.

6. A reflecting attachment for lamps, comprising a suitable frame or casing adapted to be removably supported upon a lamp and having a light-conducting tube extending outward therefrom at one side, a reflector located within the frame or casing opposite the light-conducting tube, a light-projecting tube adjustably mounted upon the end of said conducting-tube, a band or collar adapted to surround a part of the lamp, and connections between said band or collar and the under side of the frame or casing, substantially as described.

7. A reflecting attachment for lamps, comprising a suitable frame or casing adapted to be removably supported upon a lamp and having a light-conducting tube extending outward therefrom at one side, a reflector located within the frame or casing opposite the light-conducting tube, a light-projecting tube adjustably mounted upon the end of said conducting-tube, a split band or collar adapted to surround a part of the lamp, means for adjusting and attaching the band or collar to the lamp, and flexible connections leading from the band or collar and attached at their upper ends to the under side of the frame or casing at the corners thereof, substantially as described.

In testimony whereof I have hereunto set my hand in presence of two subscribing witnesses.

ALONZO C. BALL.

Witnesses:
W. N. HURT,
C. F. WITTY.